US012577976B2

(12) United States Patent　　　　(10) Patent No.:　US 12,577,976 B2
　　　 Oikawa　　　　　　　　　　　　(45) Date of Patent:　　Mar. 17, 2026

(54) POWER TRANSMISSION DEVICE WITH MOTOR AND INVERTER

(71) Applicant: JATCO Ltd, Fuji City (JP)

(72) Inventor: Shota Oikawa, Fuji (JP)

(73) Assignee: JATCO Ltd, Fuji City (JP)

( * ) Notice: Subject to any disclaimer, the term of this patent is extended or adjusted under 35 U.S.C. 154(b) by 0 days.

(21) Appl. No.: 18/844,145

(22) PCT Filed: Nov. 29, 2022

(86) PCT No.: PCT/JP2022/044063
　　 § 371 (c)(1),
　　 (2) Date: Sep. 5, 2024

(87) PCT Pub. No.: WO2023/171052
　　 PCT Pub. Date: Sep. 14, 2023

(65) Prior Publication Data
　　 US 2025/0172170 A1　　May 29, 2025

(30) Foreign Application Priority Data

Mar. 9, 2022　　(JP) ................................. 2022-035856

(51) Int. Cl.
　　 *F16F 15/10*　　　　　(2006.01)
　　 *B60K 1/00*　　　　　(2006.01)
　　　　　　　　(Continued)

(52) U.S. Cl.
　　 CPC .................. *F16C 3/02* (2013.01); *B60K 1/00* (2013.01); *F16H 57/021* (2013.01);
　　　　　　　　(Continued)

(58) Field of Classification Search
　　 CPC ................ B60K 2001/001; B60K 1/00; F16H 2057/02034; F16H 57/021; F16H 57/037; F16F 15/10; F16F 15/12; F16F 15/129
　　 See application file for complete search history.

(56) References Cited

U.S. PATENT DOCUMENTS 6,756,945 B2　　6/2004　Mizutani
8,863,390 B1 *　10/2014　Ley .......................... F16C 3/023
　　　　　　　　　　　　　　　　　　　　　　29/469
　　　　　　　　(Continued)

FOREIGN PATENT DOCUMENTS

DE　　　　　10232351 A1 *　3/2003　.......... F16F 15/1442
JP　　　2003-142911 A　　5/2003
　　　　　　　　(Continued)

OTHER PUBLICATIONS

Takizawa et al., Shielding Member and Mobile Body Provided With Shielding Member, Feb. 12, 2009, EPO, JP 2009-029218 A, Machine Translation of Description (Year: 2009).*

(Continued)

*Primary Examiner* — James A English
(74) *Attorney, Agent, or Firm* — Foley & Lardner LLP

(57)　　　　　　ABSTRACT

A device includes: a motor, an inverter configured to drive the motor, a gear device connected downstream of the motor, and a drive shaft configured to transmit, to a drive wheel, power of the motor transmitted from the gear device, and the drive shaft includes a portion covered with a noise reducing material.

5 Claims, 6 Drawing Sheets

(51) Int. Cl.
   *F16C 3/02*        (2006.01)
   *F16H 57/021*      (2012.01)
   *F16H 57/02*       (2012.01)

(52) U.S. Cl.
   CPC .... *B60K 2001/001* (2013.01); *F16C 2223/32* (2013.01); *F16C 2226/40* (2013.01); *F16C 2326/06* (2013.01); *F16H 2057/02034* (2013.01); *F16H 2057/02052* (2013.01)

(56)                References Cited

U.S. PATENT DOCUMENTS

| | | | | |
|---|---|---|---|---|
| 9,003,807 | B2 * | 4/2015 | Chehab | F01D 25/10 |
| | | | | 60/785 |
| 10,641,354 | B1 * | 5/2020 | Conger | F16F 15/322 |
| 2003/0042086 | A1 * | 3/2003 | Nylander | F16F 15/10 |
| | | | | 188/159 |

| | | | | |
|---|---|---|---|---|
| 2003/0080908 | A1 * | 5/2003 | Mizutani | H01Q 13/10 |
| | | | | 343/711 |
| 2006/0094517 | A1 * | 5/2006 | Hirsch | F16D 3/841 |
| | | | | 464/170 |
| 2007/0204453 | A1 * | 9/2007 | Sun | F16F 15/322 |
| | | | | 29/896.93 |
| 2013/0057096 | A1 | 3/2013 | Okada et al. | |

FOREIGN PATENT DOCUMENTS

| | | |
|---|---|---|
| JP | 2014-017173 A | 1/2014 |
| JP | 2014-147293 A | 8/2014 |
| JP | 2018-035819 A | 3/2018 |

OTHER PUBLICATIONS

Koji Kamei, Core for Emi Countermeasure, Manufacture Thereof, and Bobbin Used Therefor, Nov. 2, 2000, EPO, JP 2000-306736 A, Machine Translation of Description (Year: 2000).*

* cited by examiner

DIRECTION OF ROTATION AXIS X

DIRECTION OF ROTATION AXIS X

LONGITUDINAL DIRECTION 91

LATERAL
DIRECTION

POWER TRANSMISSION DEVICE WITH MOTOR AND INVERTER

TECHNICAL FIELD

The present invention relates to a device.

BACKGROUND ART

Patent Document 1 discloses a device including a motor and an inverter that drives the motor. A gear device is connected downstream of the motor. A drive shaft is connected downstream of the gear device. Power (rotation force) generated by the motor is transmitted to drive wheels via the gear device and the drive shaft.

PRIOR ART DOCUMENT

Patent Document

Patent Document 1: JP 2014-147293 A

SUMMARY OF INVENTION

High frequency noise is generated when a transistor of the inverter repeatedly turns on and off at a high speed. The noise is propagated from the inverter, which is a source of the noise, to a power transmission path of the motor. The noise is finally emitted from the drive shaft, which acts as an antenna. The emitted noise can affect peripheral devices such as radios.

In the device, there is a demand for reducing the noise emitted from the drive shaft.

A device according to an aspect of the present invention includes:

a motor;

an inverter configured to drive the motor;

a gear device connected downstream of the motor; and a drive shaft configured to transmit, to a drive wheel, power of the motor transmitted from the gear device, in which the drive shaft includes a portion covered with a noise reducing material.

According to an aspect of the present invention, noise emitted from a drive shaft can be reduced.

DESCRIPTION OF EMBODIMENTS

Figure 1:
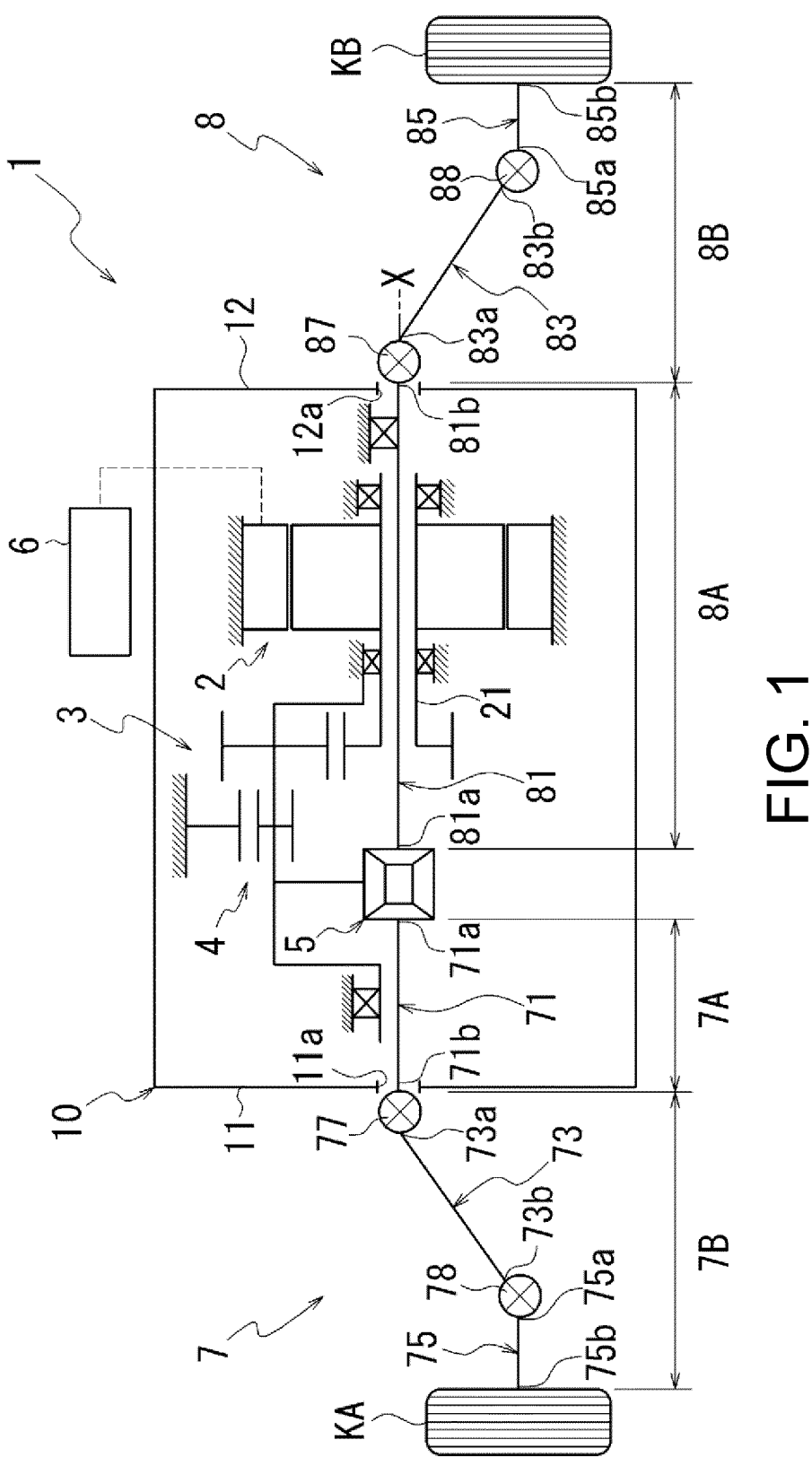
FIG. 1 is a skeleton diagram showing a power transmission device.

In the following description, a power transmission device mounted on a vehicle is described as an example of a device according to an aspect of the present invention. The power transmission device includes a motor that is a rotation electrical machine, and a power transmission mechanism that transmits power of the motor to a drive wheel. The power transmission mechanism includes, for example, a gear mechanism and/or a differential gear mechanism.

In the following description, when referring to a second element (member, portion, or the like) connected to a first element (member, portion, or the like), a second element (member, portion, or the like) connected downstream of a first element (member, portion, or the like), or a second element (member, portion, or the like) connected upstream of a first element (member, portion, or the like), it is meant that the first element and the second element are connected to each other in a power-transmissible manner. A power input side is upstream, and a power output side is downstream. Further, the first element and the second element may be connected to each other via another element (clutch, other gear mechanism, or the like).

"Overlapping when viewed from a predetermined direction" means that a plurality of elements are arranged in a predetermined direction, and has the same meaning as "overlapping in a predetermined direction". The "predetermined direction" is, for example, an axial direction, a radial direction, a gravity direction, or a vehicle traveling direction (vehicle forward direction and vehicle backward direction).

If a drawing shows that a plurality of elements (member, portion, or the like) are arranged in a predetermined direction, it can be considered that in explanation of the description, there is a sentence illustrating that the plurality of elements overlap when viewed from the predetermined direction.

"Not overlapping when viewed from a predetermined direction" and "offset when viewed from a predetermined direction" mean that a plurality of elements are not arranged in a predetermined direction, and has the same meaning as "not overlapping in a predetermined direction" and "offset in a predetermined direction". The "predetermined direction" is, for example, an axial direction, a radial direction, a gravity direction, or a vehicle traveling direction (vehicle forward direction and vehicle backward direction).

If a drawing shows that a plurality of elements (member, portion, or the like) are not arranged in a predetermined direction, it can be considered that in explanation of the description, there is a sentence illustrating that the plurality of elements do not overlap when viewed from the predetermined direction.

"When viewed from a predetermined direction, a first element (member, portion, or the like) is positioned between a second element (member, portion, or the like) and a third element (member, portion, or the like)" means that the first element can be observed to be between the second element and the third element when viewed from the predetermined direction. The "predetermined direction" is, for example, an axial direction, a radial direction, a gravity direction, or a vehicle traveling direction (vehicle forward direction and vehicle backward direction).

For example, when the second element, the first element, and the third element are arranged in this order along the axial direction, it can be said that the first element is positioned between the second element and the third element when viewed from the radial direction. If a drawing shows that a first element is between a second element and a third element when viewed from a predetermined direction, it can be considered that in explanation of the description, there is a sentence illustrating that the first element is between the second element and the third element when viewed from the predetermined direction.

In the following description, the "axial direction" means an axial direction of a rotation axis of a member that constitutes the device. The "radial direction" means a direction orthogonal to the rotation axis of the member that constitutes the device. A "circumferential direction" refers to a circumferential direction about the rotation axis of the member that constitutes the device.

FIG. 1 is a skeleton diagram illustrating a power transmission device 1.

As shown in FIG. 1, the power transmission device 1 includes a motor 2, a power transmission mechanism 3, and an inverter 6. The motor 2 is driven by the inverter 6. Power generated by rotation of the motor 2 about a rotation axis X is transmitted to drive wheels KA and KB of a vehicle via the power transmission mechanism 3. The motor 2 is a rotation electrical machine having at least one of an electric motor function and a generator function.

The power transmission mechanism 3 includes a gear device including a planetary reduction gear 4 and a differential mechanism 5, and drive shafts 7, 8 serving as output shafts. The planetary reduction gear 4 is connected downstream of the motor 2. The differential mechanism 5 is connected downstream of the motor 2 via the planetary reduction gear 4. The differential mechanism 5 is disposed coaxially with the rotation axis X. The drive shafts 7, 8 are connected downstream of the differential mechanism 5.

In the power transmission device 1, the planetary reduction gear 4, the differential mechanism 5, and the drive shafts 7, 8 are provided along a transmission path for output rotation about the rotation axis X of the motor 2.

The output rotation of the motor 2 is transmitted to the planetary reduction gear 4 via a motor shaft 21. The planetary reduction gear 4 reduces the transmitted rotation and outputs the reduced rotation to the differential mechanism 5. The drive shafts 7, 8 are connected to one side and the other side in the direction of the rotation axis X of the differential mechanism 5, respectively. The differential mechanism 5 outputs the rotation input from a planetary reduction gear 4 side to the drive shafts 7, 8.

As shown in FIG. 1, the motor 2 and the gear device (planetary reduction gear 4 and differential mechanism 5) are accommodated in a case 10.

Although not shown, the case 10 may include a partition wall between the motor 2 and the gear device (planetary reduction gear 4 and differential mechanism 5). The motor 2 and the gear device (planetary reduction gear 4 and differential mechanism 5) may be accommodated in separate cases, and the cases may be joined together to form the case 10.

The drive shafts 7, 8 are connected to the differential mechanism 5 inside the case 10. The drive shafts 7, 8 are respectively connected to the left and right drive wheels KA, KB of the vehicle outside the case 10. The output rotation of the motor 2 is finally transmitted to the drive wheels KA, KB via the drive shafts 7, 8.

The inverter 6 is an electronic component including a smoothing capacitor, a transistor, a driver board, and the like (not shown). The inverter 6 is electrically connected to the motor 2 in the case 10. The inverter 6 converts a direct current into an alternating current and supplies the alternating current to the motor 2 to drive the motor 2. The inverter 6 controls a rotation speed of the motor 2 by changing a frequency of the alternating current.

Figure 2:
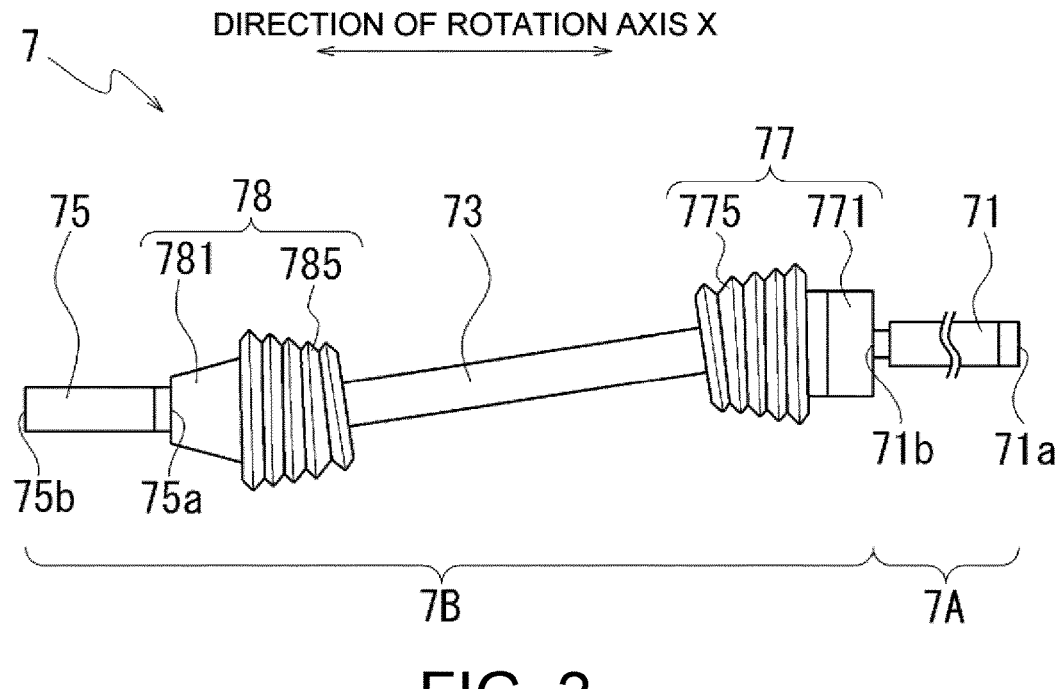
FIG. 2 is a diagram showing a drive shaft 7.

FIG. 2 is a diagram showing the drive shaft 7.

As shown in FIGS. 1 and 2, the drive shaft 7 includes a differential-side shaft member 71, an intermediate shaft member 73, and a drive wheel-side shaft member 75.

The differential-side shaft member 71 is located inside the case 10 as a first region 7A of the drive shaft 7.

The intermediate shaft member 73 and the drive wheel-side shaft member 75 are positioned outside the case 10.

The drive wheel-side shaft member 75 is connected to the drive wheel KA in manner of being capable of transmitting rotation thereto. The intermediate shaft member 73 is provided between the differential-side shaft member 71 and the drive wheel-side shaft member 75. The intermediate shaft member 73 is connected to the differential-side shaft member 71 and the drive wheel-side shaft member 75 via universal joints 77 and 78 in manner of being capable of transmitting rotation.

The intermediate shaft member 73, the drive wheel-side shaft member 75, and the universal joints 77, 78 are positioned outside the case 10 as a second region 7B of the drive shaft 7.

As shown in FIG. 1, the differential-side shaft member 71 is disposed coaxially with the rotation axis X of the motor 2 inside the case 10. One end 71a of the differential-side shaft member 71 is connected to the differential mechanism 5 from one side in the direction of the rotation axis X (left side in the figure). An opening 11a is provided at an end portion 11 of the case 10 in the direction of the rotation axis X. The other end 71b of the differential-side shaft member 71 in the direction of the rotation axis X passes through the opening 11a and is connected to the universal joint 77 located near the opening 11a.

One end 73a of the intermediate shaft member 73 in the direction of the rotation axis X is connected to the universal joint 77 from an opposite side of the differential-side shaft member 71. The other end 73b of the intermediate shaft member 73 in the direction of the rotation axis X is connected to the universal joint 78.

One end 75a of the drive wheel-side shaft member 75 in the direction of the rotation axis X is connected to the universal joint 78 from an opposite side of the intermediate shaft member 73. The other end 75b of the drive wheel-side shaft member 75 in the direction of the rotation axis X is connected to the drive wheel KA.

As shown in FIG. 2, the universal joint 77 includes a joint member 771 that is coupled to the intermediate shaft member 73, and a boot 775 that covers a coupling portion (not shown) of the joint member 771 and the intermediate shaft member 73. Although not shown, the intermediate shaft member 73 is swingably coupled to an inside of the joint member 771. The boot 775 prevents leakage of a lubricant enclosed in the joint member 771 and prevents a foreign matter from entering from an outside.

The universal joint 78 includes a joint member 781 coupled to the intermediate shaft member 73, and a boot 785 that covers a coupling portion between the joint member 781 and the intermediate shaft member 73. Although not shown, the intermediate shaft member 73 is swingably coupled to an inside of the joint member 781. The boot 785 prevents leakage of the lubricant enclosed in the joint member 781 and prevents a foreign matter from entering from an outside.

Figure 3:
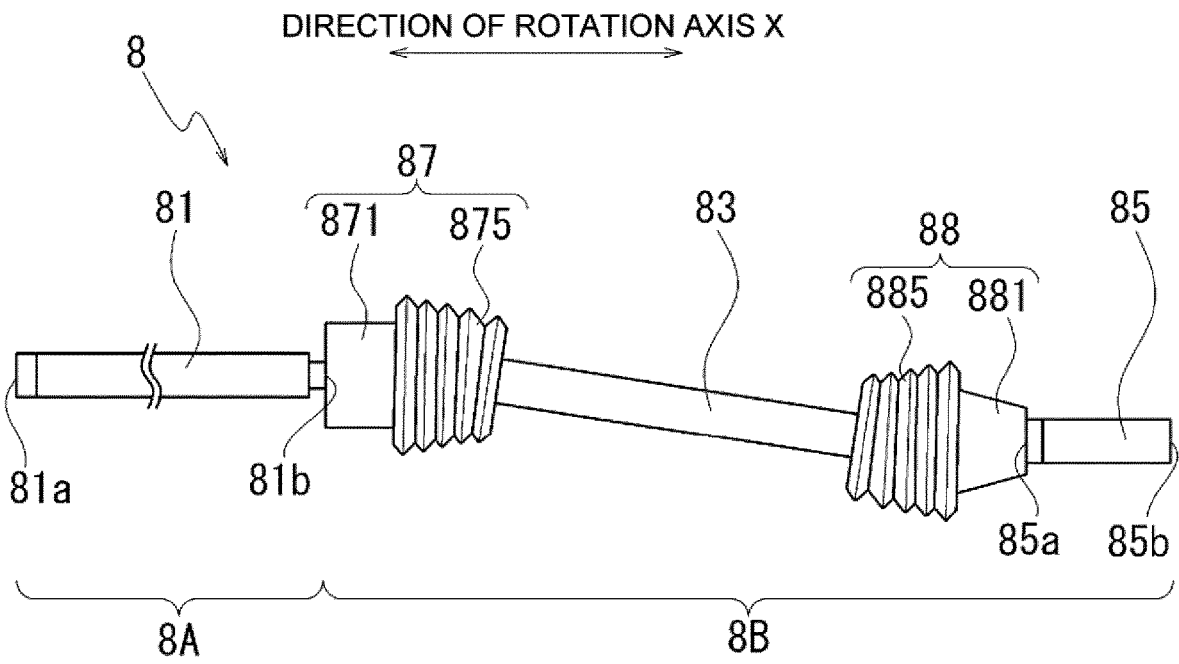
FIG. 3 is a diagram showing a drive shaft 8.

FIG. 3 is a diagram showing the drive shaft 8.

As shown in FIGS. 1 and 3, the drive shaft 8 includes a differential-side shaft member 81, an intermediate shaft member 83, and a drive wheel-side shaft member 85.

As shown in FIG. 1, the differential-side shaft member 81 is located inside the case 10 as a first region 8A of the drive shaft 8.

The intermediate shaft member 83 and the drive wheel-side shaft member 85 are positioned outside the case 10.

The drive wheel-side shaft member 85 is connected to the drive wheel KB. The intermediate shaft member 83 is provided between the differential-side shaft member 81 and the drive wheel-side shaft member 85. The intermediate shaft member 83 is connected to the differential-side shaft member 81 and the drive wheel-side shaft member 85 via universal joints 87, 88, respectively.

The intermediate shaft member 83, the drive wheel-side shaft member 85, and the universal joints 87, 88 are positioned outside the case 10 as a second region 8B of the drive shaft 8.

As shown in FIG. 1, the differential-side shaft member 81 is disposed coaxially with the rotation axis X of the motor 2 inside the case 10. One end 81*a* of the differential-side shaft member 81 in the direction of the rotation axis X is connected to the differential mechanism 5 from the other side (right side in the figure) in the direction of the rotation axis X. The differential-side shaft member 81 is inserted through an inner periphery of the motor shaft 21 inside the case 10. An opening 12*a* is provided at an end portion 12 of the case 10 on the other side in the direction of the rotation axis X. The other end 81*b* of the differential-side shaft member 81 in the direction of the rotation axis X passes through the opening 12*a* and is connected to the universal joint 87 located near the opening 12*a*.

One end 83*a* of the intermediate shaft member 83 in the direction of the rotation axis X is connected to the universal joint 87 from an opposite side of the differential-side shaft member 81. The other end 83*b* of the intermediate shaft member 83 in the direction of the rotation axis X is connected to the universal joint 88.

One end 85*a* of the drive wheel-side shaft member 85 in the direction of the rotation axis X is connected to the universal joint 88 from an opposite side of the intermediate shaft member 83. The other end 85*b* of the drive wheel-side shaft member 85 in the direction of the rotation axis X is connected to the drive wheel KB.

As shown in FIG. 3, the universal joint 87 includes a joint member 871 that is coupled to the intermediate shaft member 83, and a boot 875 that covers a coupling portion between the joint member 871 and the intermediate shaft member 83. Although not shown, the intermediate shaft member 83 is swingably coupled to an inside of the joint member 871. The boot 875 prevents leakage of the lubricant enclosed in the joint member 871 and prevents a foreign matter from entering from an outside.

The universal joint 88 includes a joint member 881 that is coupled to the intermediate shaft member 83, and a boot 885 that covers a coupling portion of the joint member 881 and the intermediate shaft member 83. Although not shown, the intermediate shaft member 83 is swingably coupled to an inside of the joint member 881. The boot 885 prevents leakage of the lubricant enclosed in the joint member 881 and prevents a foreign matter from entering from an outside.

Figure 4:
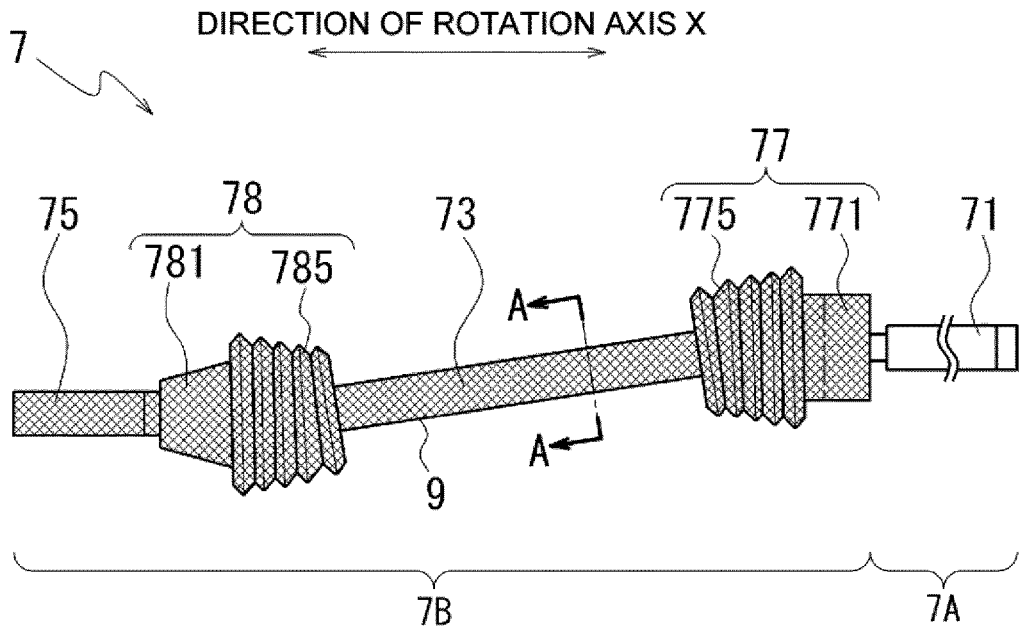
FIG. 4 is a diagram showing the drive shaft 7 provided with a noise reduction sheet.

FIG. 4 is a diagram showing the drive shaft 7 provided with a noise reduction sheet.

Figure 5:
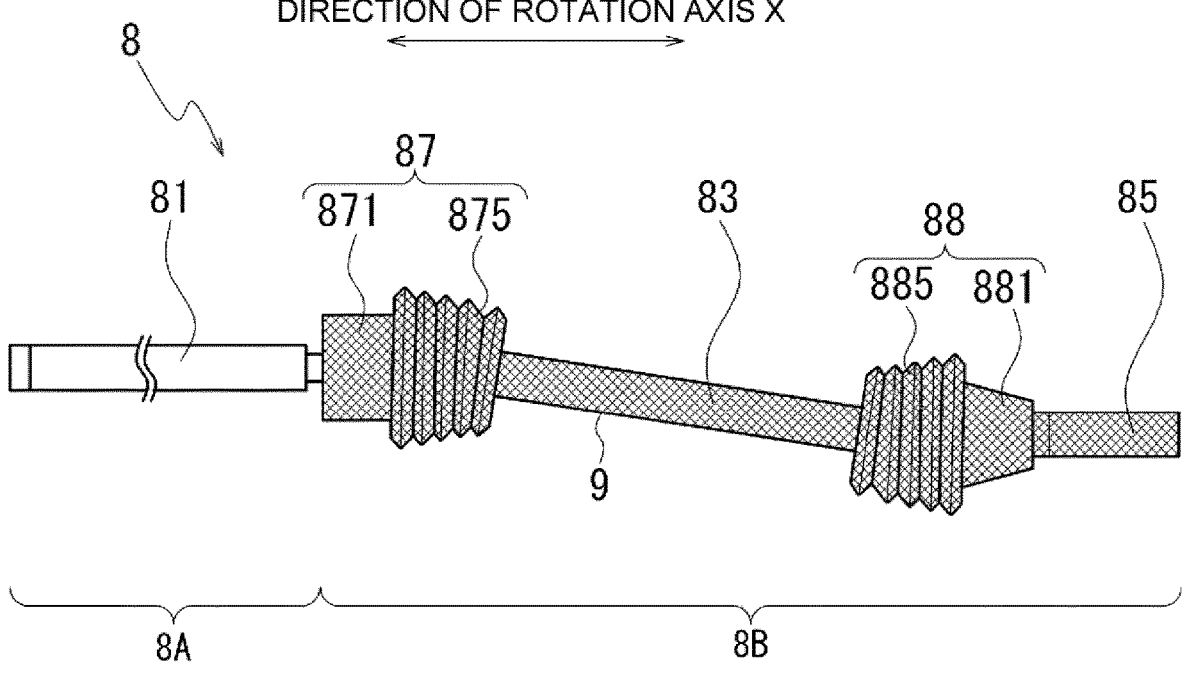
FIG. 5 is a diagram showing the drive shaft 8 provided with a noise reduction sheet.

FIG. 5 is a diagram showing the drive shaft 8 provided with a noise reduction sheet.

Figure 6:
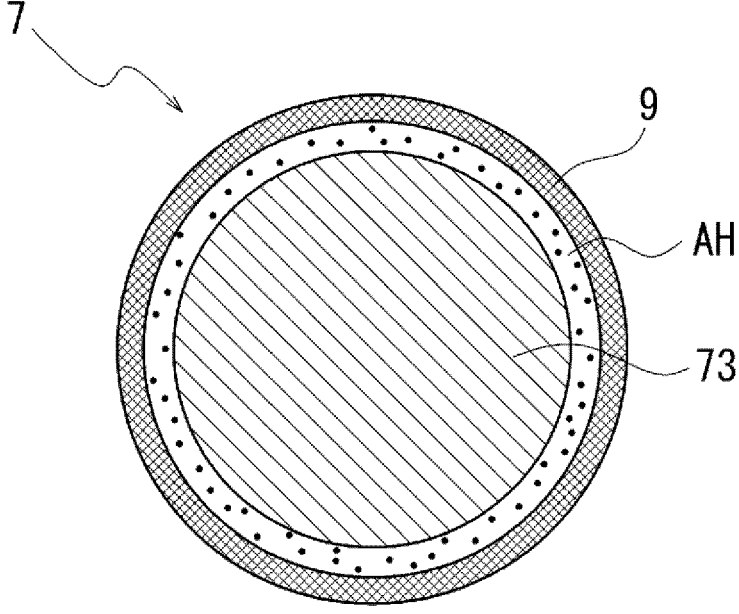
FIG. 6 is a cross-sectional view taken along a line A-A in FIG. 4.

FIG. 6 is a cross-sectional view taken along a line A-A in FIG. 4.

In FIGS. 4 to 6, a noise reduction sheet 9 is shown by cross-hatching for ease of understanding. Further, in FIG. 6, thicknesses of the noise reduction sheet 9 and an adhesive AH are exaggerated for easy understanding.

As shown in FIGS. 4 and 5, each of the drive shafts 7, 8 includes a portion that is covered with the noise reduction sheet 9 (noise reducing material). In other words, the drive shafts 7, 8 respectively have portions that overlap with the noise reduction sheet 9 when viewed in radial directions of the respective axes.

As shown in FIG. 4, the second region 7B of the drive shaft 7 is covered with the noise reduction sheet 9. Specifically, surfaces of the intermediate shaft member 73, the drive wheel-side shaft member 75, and the universal joints 77, 78 are covered with the noise reduction sheet 9.

As shown in FIG. 5, similarly, the second region 8B of the drive shaft 8 is covered with the noise reduction sheet 9. Specifically, surfaces of the intermediate shaft member 83, the drive wheel-side shaft member 85, and the universal joints 87, 88 are covered with the noise reduction sheet 9.

As described above, the second regions 7B, 8B of the drive shafts 7, 8 are regions located outside the case 10 (see FIG. 1).

The noise reduction sheet 9 has a characteristic of converting high-frequency noise into heat. The noise reduction sheet 9 is provided to reduce the noise.

The noise reduction sheet 9 is, for example, a resin film or a film containing a magnetic material, a conductive material, or the like. Examples of the conductive material include metals, carbon, and graphite. The noise reduction sheet 9 may be obtained by coating a fiber such as a woven fabric, a knitted fabric, or a nonwoven fabric with a conductive material, or may be a sheet in which a magnetic material or a conductive material is supported on the above-described various fibers.

As shown in FIG. 6, the noise reduction sheet 9 is attached so as to cover a surface of the drive shaft 7. The noise reduction sheet 9 can be attached closely to the surface of the drive shaft 7 using, for example, the adhesive AH.

Although FIG. 6 illustrates the intermediate shaft member 73, similarly, the noise reduction sheet 9 can be attached to the drive wheel-side shaft member 75 and the universal joints 77 and 78 using the adhesive AH. Although not shown, similarly, the noise reduction sheet 9 can be attached to the drive shaft 8 by using the adhesive AH.

Figures 7, 8:
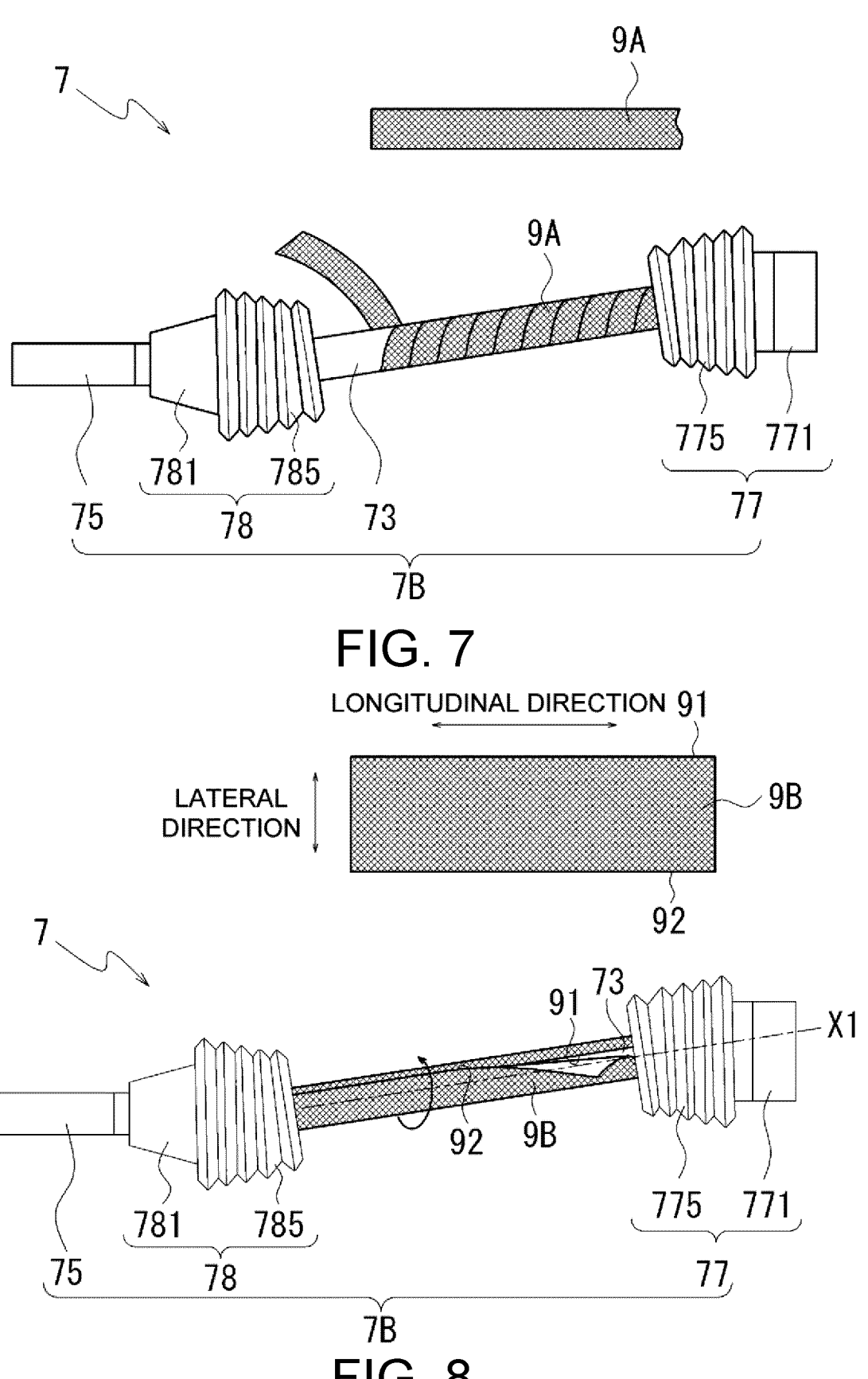
FIG. 7 is a diagram showing an example of attachment of the noise reduction sheet.
FIG. 8 is a diagram showing another example of the attachment of the noise reduction sheet.

FIG. 7 is a diagram showing an example of the attachment of the noise reduction sheet.

FIG. 8 is a diagram showing another example of the attachment of the noise reduction sheet.

FIGS. 7 and 8 show only the second region 7B of the drive shaft 7, and illustration of the adhesive is omitted. FIGS. 7 and 8 illustrate an example in which the noise reduction sheet 9 is attached to the intermediate shaft member 73 of the drive shaft 7, but the noise reduction sheet 9 can also be attached to other locations in the same manner. Similarly, the noise reduction sheet 9 can be attached to the drive shaft 8 in the same manner.

In the following description, the noise reduction sheets 9 are also referred to as a noise reduction sheet 9A and a noise reduction sheet 9B as necessary.

As shown in FIG. 7, the noise reduction sheet 9A may have a strip shape, for example. The strip-shaped noise reduction sheet 9A may be wound in a spiral shape, for example, around a surface of the intermediate shaft member 73 with phases shifted from one another. FIG. 7 shows an example in which the noise reduction sheet 9A is attached to the intermediate shaft member 73, but the strip-shaped noise reduction sheet 9A can also be wound around the universal joints 77, 78, for example. Accordingly, the noise reduction sheet 9A can be attached closely to the universal joints 77, 78 which have many projections and recesses on surfaces thereof.

As shown in FIG. 8, the noise reduction sheet 9B may have a rectangular shape, for example. The rectangular-shaped noise reduction sheet 9B can be attached to the surface of the intermediate shaft member 73 with a longitudinal direction aligned with a direction of an axis X1 of the intermediate shaft member 73 and one end 91 and the other end 92 in a lateral direction abutting against each other. Alternatively, the noise reduction sheet 9B may be attached such that the other end 92 overlaps with the one end 91.

The intermediate shaft member 73 has relatively few projections and recesses and a long axial length. Accordingly, by using the noise reduction sheet 9B having the rectangular shape, the noise reduction sheet 9B can be efficiently attached. Similarly, the rectangular-shaped noise reduction sheet 9B can be attached efficiently to the drive wheel-side shaft member 75 as well.

The shape of the noise reduction sheet 9 and a portion to which the noise reduction sheet 9 is attached are not limited to the examples in FIGS. 7 and 8. The shape of the noise reduction sheet 9 and the portion to which the noise reduction sheet 9 is attached can be appropriately changed.

Figure 9:
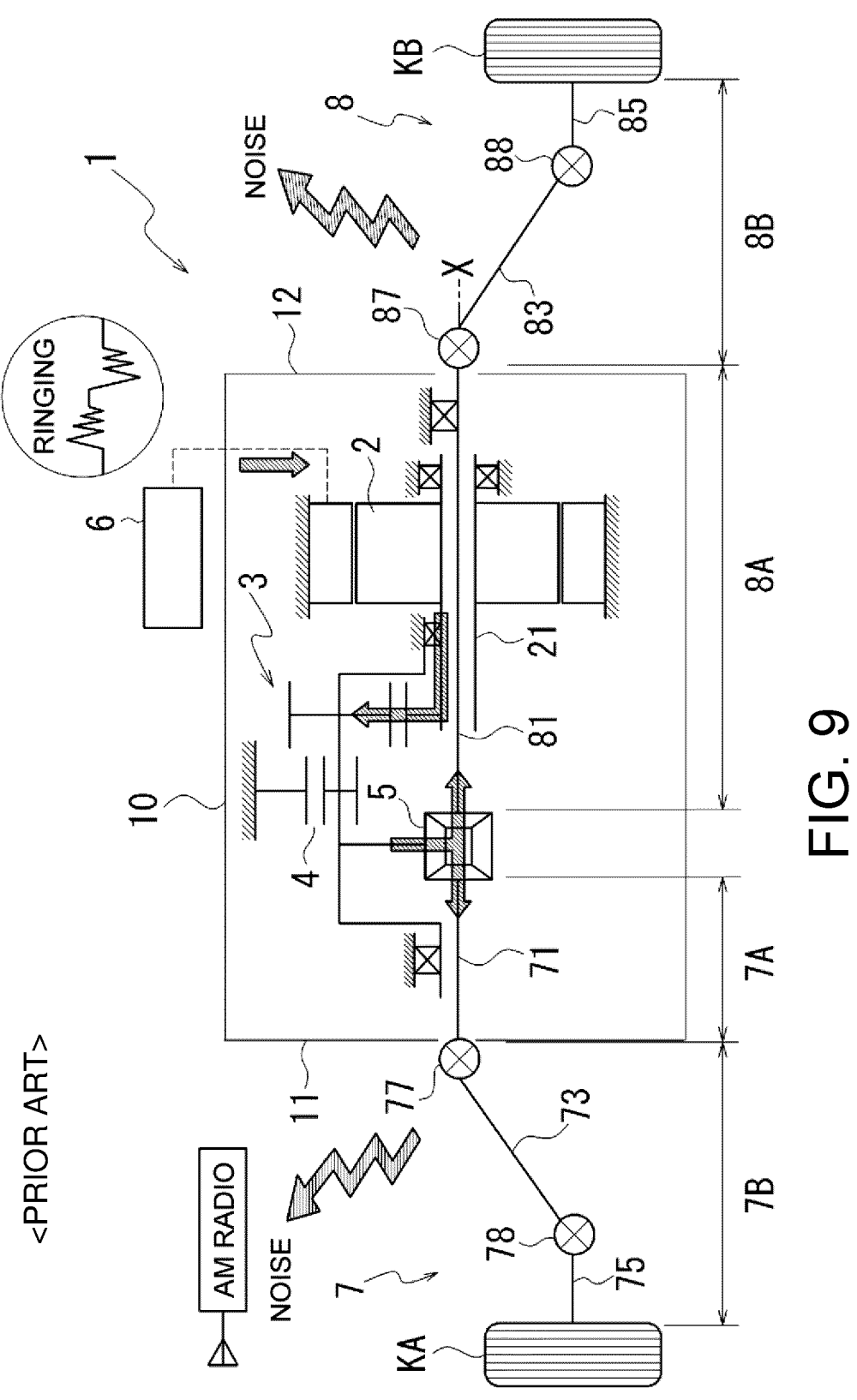
FIG. 9 is a diagram illustrating propagation of noise in the power transmission device.

FIG. 9 is a diagram illustrating propagation of the noise in the power transmission device 1. In FIG. 9, the noise is indicated by a hatched arrow.

As described above, the inverter 6 includes a transistor that is a switch element. When the transistor is repeatedly turned on and off at a high speed during control of the motor 2, ringing, which is a high-frequency noise, occurs. This noise is propagated from the inverter 6, which is a source of the noise, to a power transmission path of the motor 2. That is, the noise is finally propagated to the drive shafts 7, 8 via the motor 2, the motor shaft 21, the planetary reduction gear 4, and the differential mechanism 5.

The drive shafts 7, 8 operate as antennas. Therefore, the noise propagated to the drive shafts 7, 8 is emitted to air from the drive shafts 7, 8. The noise emitted to the air may affect vehicle equipment such as an AM radio and radio communication device mounted on the vehicle. In particular, since the second regions 7B, 8B (see FIGS. 2 and 3) of the drive shafts 7, 8 are located outside the case 10, there is a high possibility that the emitted noise affects the vehicle equipment. Here, the vehicle equipment is, for example, an electronic device provided in the vehicle in which the power transmission device 1 is mounted.

In order to reduce the emitted noise, for example, it is conceivable to provide a ground connector on the power transmission path of the motor 2. The ground connector is, for example, a sliding brush that comes into sliding contact with shaft elements (motor shaft 21, drive shafts 7, 8, and the like) on the power transmission path. The ground connector is connected to the case 10, and the case 10 is connected to a vehicle body by a ground line. Since the power transmission path is grounded to the vehicle body via the ground connector and the case 10, the noise can be reduced from being emitted from the drive shafts 7, 8.

The ground connector is preferably provided at a position away from the inverter 6 which is the source of the noise. Although the second regions 7B, 8B of the drive shafts 7, 8 are separated from the inverter 6, the intermediate shaft members 73, 83 and the drive wheel-side shaft members 75, 85 swing. Therefore, it is difficult to provide the ground connector, which is the sliding brush, so as to be in normal contact with these members. Further, it is necessary to provide the ground connector in a dry environment, but the second regions 7B, 8B located outside the case 10 may be exposed to muddy water and the like, and thus when the ground connector is provided in the second regions 7B, 8B, it is difficult to place the ground connector in the dry environment.

When the ground connector is provided inside the case 10, the ground connector is a thick member, and the layout in the case 10 is easily restricted. Further, oil for lubrication of a rotary member is stored in the case 10. In order to provide the ground connector in the dry environment, it is necessary to provide, in the case 10, a separate chamber sealed to prevent the oil from entering. However, providing the separate chamber in the case 10 may lead to an increase in size of the case 10. Furthermore, since it is necessary to bring the ground connector into contact with a metal portion, there is a possibility that a dimension of the motor shaft 21 or the differential-side shaft member 71 is enlarged. In this way, a layout of the ground connector is likely to be restricted, and this may lead to an increase in size of the power transmission device 1.

On the other hand, the noise reduction sheet 9 is a member having a small thickness, and can be provided in close contact with surfaces of the drive shafts 7, 8. Therefore, the noise reduction sheet 9 has few layout restrictions and is unlikely to lead to the increase in size of the power transmission device 1. Since it is not necessary to provide the noise reduction sheet 9 in the dry environment, the noise reduction sheet 9 can be provided in the second regions 7B, 8B of the drive shafts 7, 8 located outside the case 10. Since the noise reduction sheet 9 can be attached with the adhesive AH, the noise reduction sheet 9 can also be provided on the intermediate shaft member 73 and the drive wheel-side shaft member 75 that swing.

As described above, the drive shafts 7, 8 act as the antennas and emit the noise, thereby affecting the vehicle equipment. Further, since the second regions 7B, 8B of the drive shafts 7, 8 are exposed to an outside of the case 10, the noise emitted from the second regions 7B, 8B easily affects the vehicle equipment. By providing the noise reduction sheet 9 in manner of covering the second regions 7B, 8B, it is possible to reduce the noise that easily affects the vehicle equipment.

Hereinafter, examples of the device according to an aspect of the present invention will be listed.

(1) The power transmission device 1 (device) includes:

the motor 2;

the inverter 6 configured to drive the motor 2;

the planetary reduction gear 4 and the differential mechanism 5 (gear device) connected downstream of the motor 2; and the drive shafts 7, 8 configured to transmit, to the drive wheels KA, KB, power of the motor 2 transmitted from the planetary reduction gear 4 and the differential mechanism 5.

The drive shafts 7, 8 respectively have portions (second region 7B and second region 8B) covered with the noise reduction sheet 9 (noise reducing material).

With such a configuration, the noise emitted from the drive shafts 7, 8 can be reduced.

The power transmission device 1 includes the motor 2, the gear device, the drive shafts 7, 8, and the drive wheels KA, KB provided along the power transmission path. The motor 2 is driven by the inverter 6. The power (rotation force) generated by the motor 2 is transmitted to the drive wheels KA, KB via the gear device and the drive shafts 7, 8.

The high-frequency noise generated by the inverter 6 is propagated to the drive shafts 7, 8 along the power transmission path of the motor 2. The propagated noise is finally emitted from the drive shafts 7, 8 acting as the antennas. The noise emitted from the drive shafts 7, 8 may affect the vehicle equipment such as an AM radio.

By respectively providing the portions covered with the noise reducing material on the drive shafts 7, 8, the noise emitted from the drive shafts 7, 8 can be reduced. Further, by using the noise reducing material as the sheet-shaped noise reduction sheet 9, the noise reducing material can be easily attached in manner of being wound around the drive shafts 7, 8. Further, the noise reduction sheet 9 requires little space for installation, and therefore the increase in size of the device can be reduced. Furthermore, since the noise reduction sheet 9 is not subject to many restrictions regarding an installation environment, such as a dry environment, and therefore allows for greater freedom in layout.

(2) A drive shaft of the power transmission device 1 includes the drive shaft 7 (first drive shaft) and the drive shaft 8 (second drive shaft).

The noise reduction sheet 9 is preferably provided on both the drive shaft 7 and the drive shaft 8.

The power transmission device 1 includes the two drive shafts 7, 8 in order to transmit the power to each of the left and right drive wheels KA, KB. The two drive shafts 7 and 8 act as the antennas to emit the noise. Therefore, by providing the noise reduction sheet 9 on at least one of the two drive shafts 7, 8, and preferably on both, a noise reducing effect (effect of reducing the emitted noise) can be improved.

(3) The power transmission device 1 includes the case 10 that accommodates the planetary reduction gear 4 and the differential mechanism 5 (gear device).

The drive shafts 7, 8 respectively have the first regions 7A, 8A connected to the differential mechanism 5 of the gear device inside the case 10. The first regions 7A, 8A respectively include the differential-side shaft members 71, 81.

The drive shafts 7, 8 respectively have the second regions 7B, 8B connected to the drive wheels KA, KB outside the case 10.

The second region 7B includes the intermediate shaft member 73, the drive wheel-side shaft member 75, and the universal joints 77, 78. The second region 8B includes the intermediate shaft member 83, the drive wheel-side shaft member 85, and the universal joints 87, 88.

The portion covered with the noise reduction sheet 9 can be provided in each of the second regions 7B, 8B of the drive shafts 7, 8.

Since the second regions 7B, 8B of the drive shafts 7, 8 are located outside the case 10, the noise propagated to the drive shafts 7, 8 is easily emitted to an outside of the power transmission device 1 from the portions of the second regions 7B, 8B exposed to the outside. By providing the noise reduction sheet 9 in the second regions 7B, 8B, the noise reducing effect can be improved.

Further, the second regions 7B, 8B of the drive shafts 7, 8 are located outside the case 10, and thus may be exposed to muddy water or the like. The noise reduction sheet 9 is not required to be used in the dry environment. Therefore, even if the noise reduction sheet 9 is provided in the second regions 7B, 8B which are not always under the dry environment, the noise reducing effect can be exhibited.

Further, since the noise reduction sheet 9 has a sheet shape, the noise reduction sheet 9 can be provided in manner of being wound around the surfaces of the drive shafts 7 and 8. Therefore, for example, the intermediate shaft members 73, 83 of the second regions 7B, 8B are members that swing when the vehicle is traveling, and the noise reduction sheet

9 can also be provided on such swing members, that is, the intermediate shaft members 73, 83 and connecting members with these intermediate shaft members 73, 83. The noise reduction sheet 9 has a high degree of freedom in terms of installation, and can be easily provided in any location where it is desired to exert the noise reducing effect.

Although the example in which the entire second regions 7B, 8B are covered with the noise reduction sheet 9 has been described, a portion of the second regions 7B, 8B may be provided with a portion that is covered with the noise reduction sheet 9.

(4) The noise reduction sheet 9 is preferably provided in close contact with the drive shafts 7 and 8.

When there is an air layer between the drive shafts 7 and 8 and the noise reduction sheet 9, the noise reducing effect may be affected. By bringing the noise reduction sheet 9 into close contact with the surfaces of the drive shafts 7 and 8, it is possible to more effectively reduce the noise.

(5) The noise reduction sheet 9 can be attached to the drive shafts 7 and 8 by, for example, an adhesive AH.

By using the adhesive AH, the noise reduction sheet 9 can be easily brought into close contact with the drive shafts 7 and 8.

The noise reducing material is not limited to a sheet-shaped material. The noise reducing material may be, for example, a powdered magnetic material, a conductive material, or the like, which is directly applied or sprayed onto the surfaces of the drive shafts 7, 8.

The example in which the noise reduction sheet 9 is attached to the drive shafts 7 and 8 using the adhesive AH has been described. An installation mode of the noise reduction sheet 9 is not limited to this mode. The noise reduction sheet 9 may be applied to the drive shafts 7 and 8 using, for example, a double-sided tape. The noise reduction sheet 9 may be in close contact with the surfaces of the drive shafts 7, 8 by a method such as vapor deposition.

The example in which the noise reduction sheet 9 is provided in the second regions 7B, 8B of the drive shafts 7, 8 has been described. An installation location of the noise reduction sheet 9 is not limited to this aspect. The noise reduction sheet 9 can also be provided in the first regions 7A, 8A of the drive shafts 7, 8.

In the present embodiment, although an example in which the device is applied to the power transmission device 1 mounted on the vehicle has been described, the present invention is not limited to this aspect and the device can be applied to other devices besides the vehicle. When a plurality of examples and modifications are described in the present embodiment, these examples and modifications may be freely combined.

Although the embodiment of the present invention has been described above, the above embodiment is merely an application example of the present invention and is not intended to limit the technical scope of the present invention to the specific configuration of the above embodiment. The embodiment can be changed as appropriate within the scope of the technical idea of the invention.

The present application claims a priority of Japanese Patent Application No. 2022-035856 filed with the Japan Patent Office on Mar. 9, 2022, all the contents of which are hereby incorporated by reference.

DESCRIPTION OF REFERENCE SIGNS

1 power transmission device (device)
2 motor
4 planetary reduction gear (gear device)

5 differential mechanism (gear device)
6 inverter
7 drive shaft (first drive shaft)
8 drive shaft (second drive shaft)
7A, 8A first region
7B, 8B second region
71, 81 differential-side shaft member
73, 83 intermediate shaft member
75, 85 drive wheel-side shaft member
77, 78 universal joint
9 noise reduction sheet (noise reducing material)
10 case
KA, KB drive wheel

The invention claimed is:

1. A device comprising:
a motor;
an inverter configured to drive the motor;
a gear device connected downstream of the motor; and
a drive shaft configured to transmit, to a drive wheel, power of the motor transmitted from the gear device, wherein
the drive shaft includes a portion to which a sheet-shaped noise reducing material is directly attached,
the drive shaft includes a universal joint, and the sheet-shaped noise reducing material is directly attached to the universal joint.

2. The device according to claim 1, wherein
the drive shaft includes a first drive shaft and a second drive shaft, and
both of the first drive shaft and the second drive shaft are provided with the portion to which the sheet-shaped noise reducing material is directly attached.

3. The device according to claim 1, further comprising:
a case accommodating the gear device, wherein
the drive shaft includes
a first region that is connected to the gear device inside the case, and
a second region that is connected to the drive wheel outside the case, and
the portion to which the sheet-shaped noise reducing material is directly attached is provided in the second region.

4. The device according to claim 1, wherein
the sheet-shaped noise reducing material is directly attached to the drive shaft by an adhesive.

5. The device according to claim 1, wherein
the sheet-shaped noise reducing material is directly attached to the entire circumference of the drive shaft.

* * * * *